(12) United States Patent
Sung et al.

(10) Patent No.: US 9,680,410 B2
(45) Date of Patent: Jun. 13, 2017

(54) CORRUGATED ROOF SHEET AND PHOTOVOLTAIC ASSEMBLY COMPRISING THE SAME

(71) Applicant: Hulk Energy Technology Co., Ltd., Miaoli County (TW)

(72) Inventors: Shen-Shiou Sung, Miaoli County (TW); Ting-Hui Huang, Miaoli County (TW)

(73) Assignee: Eterbright Solar Corporation, Toufen (TW)

( * ) Notice: Subject to any disclaimer, the term of this patent is extended or adjusted under 35 U.S.C. 154(b) by 0 days.

(21) Appl. No.: 14/937,920

(22) Filed: Nov. 11, 2015

(65) Prior Publication Data
US 2016/0079913 A1    Mar. 17, 2016

Related U.S. Application Data

(62) Division of application No. 14/519,280, filed on Oct. 21, 2014, now abandoned.

(30) Foreign Application Priority Data

Sep. 12, 2014    (TW) .............................. 103131476 A

(51) Int. Cl.
*H02S 20/23*    (2014.01)
*E04D 3/30*    (2006.01)
(Continued)

(52) U.S. Cl.
CPC ................ *H02S 20/23* (2014.12); *E04D 1/02* (2013.01); *E04D 1/30* (2013.01); *E04D 3/24* (2013.01);
(Continued)

(58) Field of Classification Search
CPC . H02S 20/23; H02S 20/25; E04D 1/02; E04D 1/30; E04D 3/24; E04D 3/30; E04D 3/366; F24J 2/5249
(Continued)

(56) References Cited

U.S. PATENT DOCUMENTS 3,511,011 A * 5/1970 Straus ....................... E04D 3/30
                                                          52/478
3,520,100 A * 7/1970 Webb ........................ E04D 3/24
                                                          52/534
(Continued)

FOREIGN PATENT DOCUMENTS

FR          2952092 A1    5/2011
JP      2000220258 A      8/2000
(Continued)

*Primary Examiner* — Brian Glessner
*Assistant Examiner* — Adam Barlow
(74) *Attorney, Agent, or Firm* — Alan D. Kamrath; Kamrath IP Lawfirm, P.A.

(57) ABSTRACT

A corrugated roof sheet has a bottom, a first-side roof sheet edge portion, a second-side roof sheet edge portion, a retaining cap and a protruding portion. The first-side roof sheet edge portion has a height H1 from the bottom. The retaining cap covers the first-side roof sheet edge portion and has a lower fringe. The lower fringe has a height h2 from the bottom. The protruding portion is between the first-side roof sheet edge portion and the second-side roof sheet edge portion and has a height h3 from the bottom. The height h2 is greater than the height h3.

11 Claims, 15 Drawing Sheets

(51) Int. Cl.
 *E04D 3/366* (2006.01)
 *F24J 2/52* (2006.01)
 *E04D 3/24* (2006.01)
 *H02S 20/25* (2014.01)
 *E04D 1/02* (2006.01)
 *E04D 1/30* (2006.01)

(52) U.S. Cl.
 CPC ............... *E04D 3/30* (2013.01); *E04D 3/366* (2013.01); *F24J 2/5249* (2013.01); *H02S 20/25* (2014.12); *E04D 2001/308* (2013.01); *Y02B 10/12* (2013.01); *Y02B 10/20* (2013.01); *Y02E 10/47* (2013.01)

(58) Field of Classification Search
 USPC .... 52/173.3, 537, 538, 588.1; 126/621, 622, 126/623
 See application file for complete search history.

(56) References Cited

U.S. PATENT DOCUMENTS

| | | | |
|---|---|---|---|
| 3,990,206 A * | 11/1976 | Reusser | E04D 3/365 52/521 |
| 4,393,859 A * | 7/1983 | Marossy | F24J 2/045 126/586 |
| 5,524,409 A * | 6/1996 | Kaiser | E04D 3/362 52/537 |
| 5,935,343 A | 8/1999 | Hollick | |
| 6,201,179 B1 * | 3/2001 | Dalacu | F24J 2/045 136/244 |
| 6,245,987 B1 * | 6/2001 | Shiomi | H01L 31/048 136/244 |
| 6,269,596 B1 | 8/2001 | Ohtsuka et al. | |
| 6,489,552 B2 | 12/2002 | Yamawaki et al. | |
| 8,209,920 B2 | 7/2012 | Krause et al. | |
| 8,453,986 B2 * | 6/2013 | Schnitzer | F24J 2/5203 126/623 |
| 8,471,141 B2 | 6/2013 | Stancel et al. | |
| 2004/0159054 A1 * | 8/2004 | Adriaansen | E04C 2/543 52/81.1 |
| 2008/0000174 A1 * | 1/2008 | Flaherty | E04D 1/08 52/173.3 |
| 2009/0064606 A1 * | 3/2009 | Ceria | E04D 3/352 52/173.3 |
| 2011/0162639 A1 | 7/2011 | Jeandeaud | |
| 2013/0167472 A1 | 7/2013 | Jenkins et al. | |
| 2014/0102556 A1 * | 4/2014 | Malpas | H02S 20/23 137/360 |
| 2014/0196769 A1 | 7/2014 | Schoop et al. | |

FOREIGN PATENT DOCUMENTS

| | | |
|---|---|---|
| TW | 200615433 | 5/2006 |
| TW | M364739 U | 9/2009 |
| WO | WO2010058044 A1 | 5/2010 |

* cited by examiner

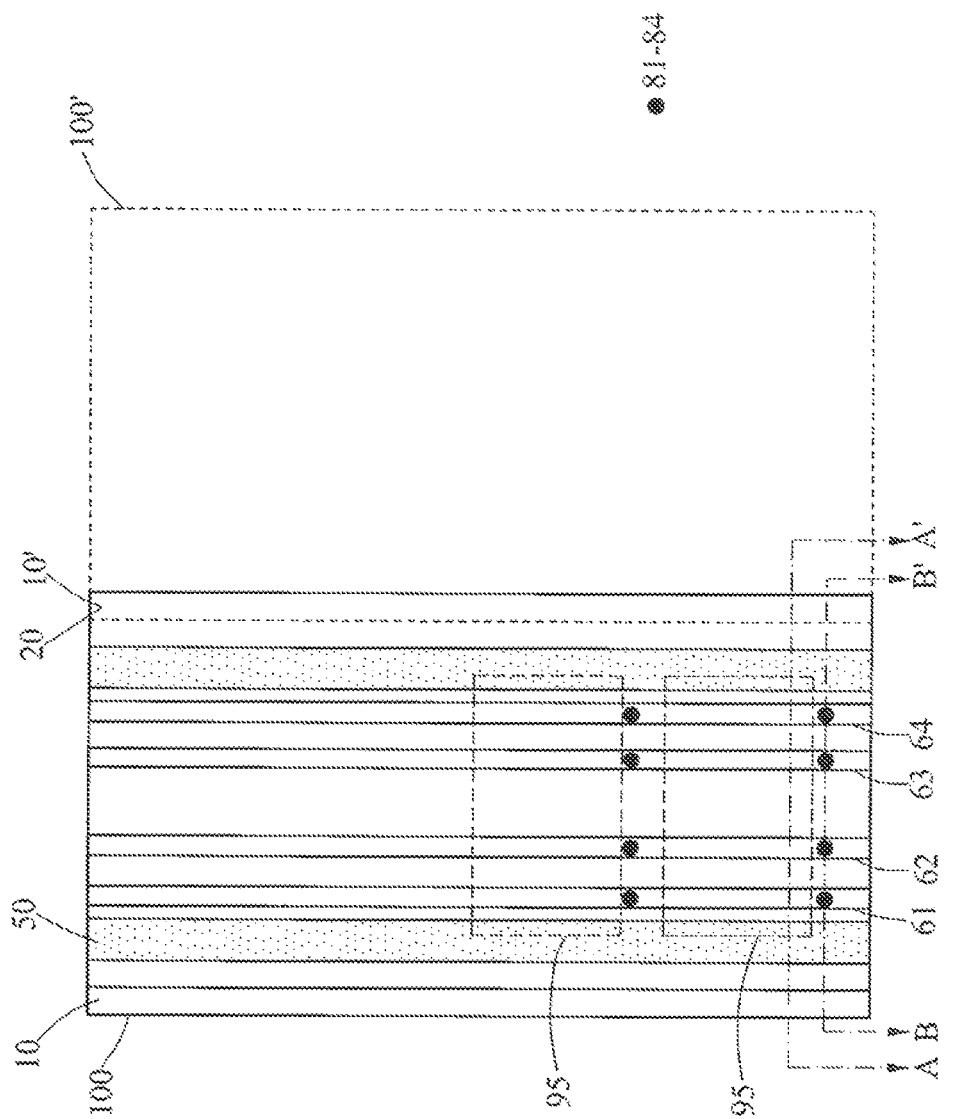

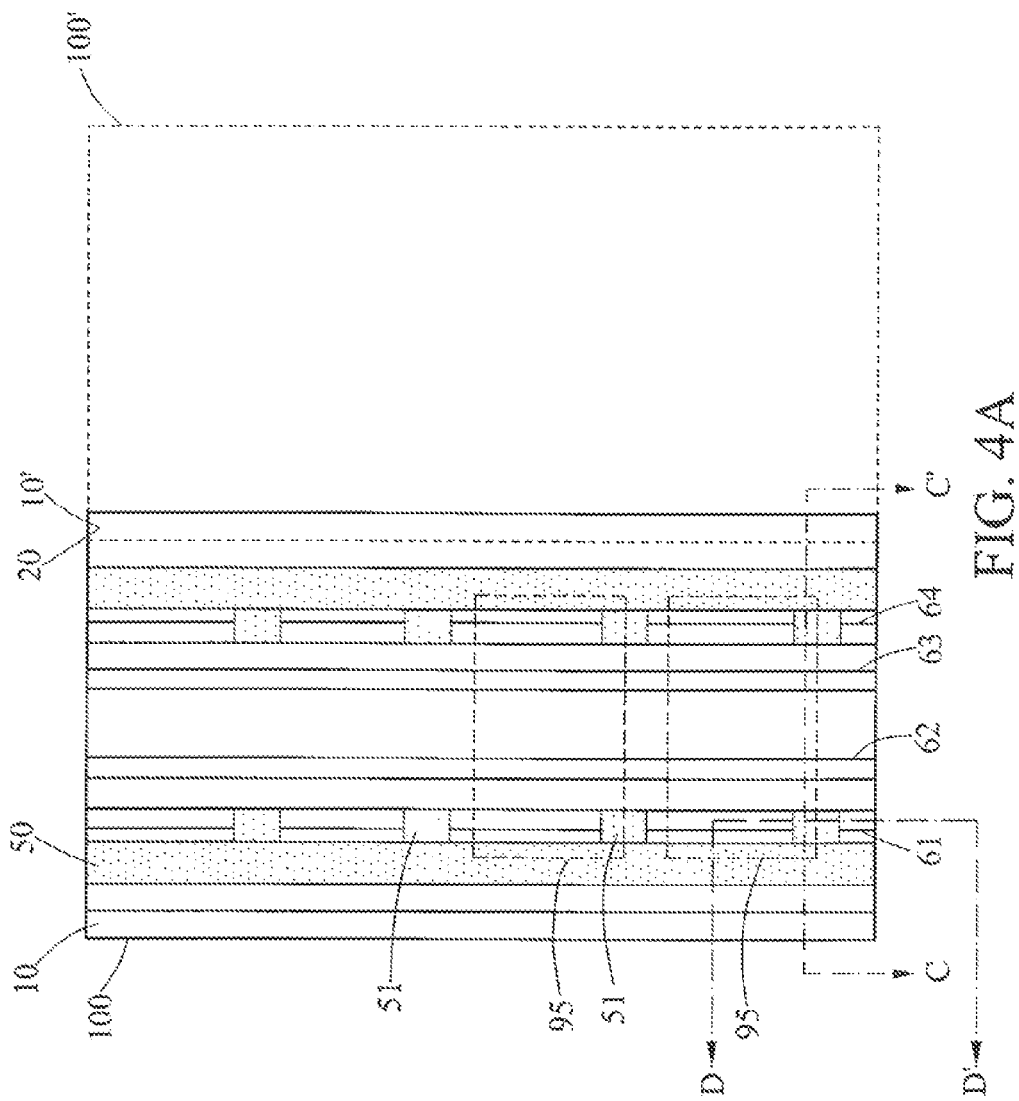

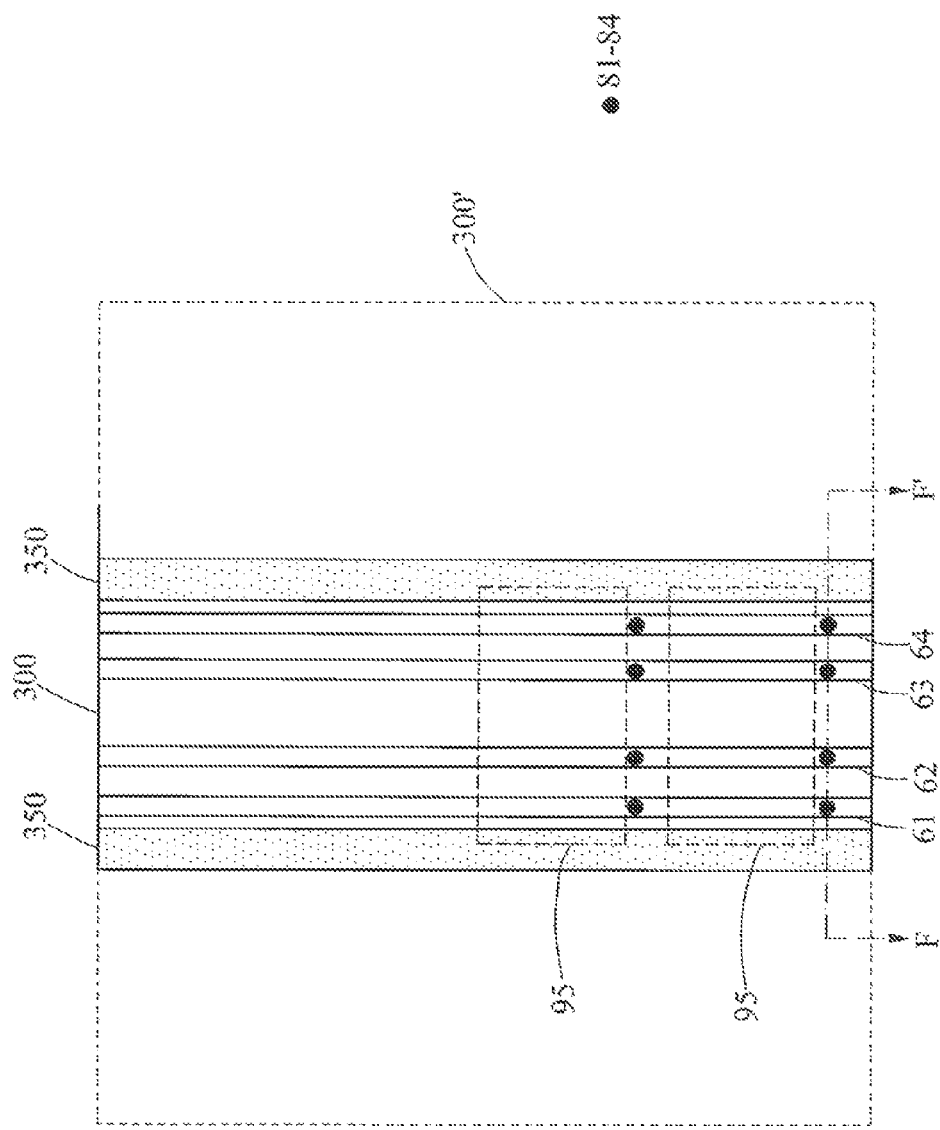

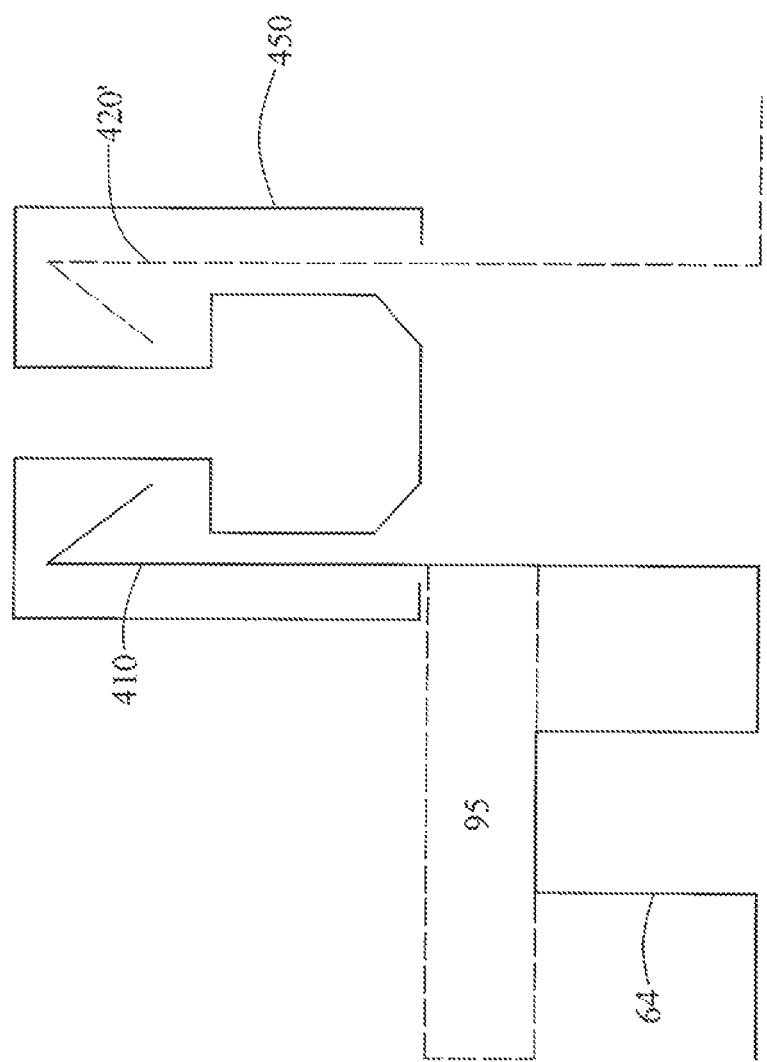

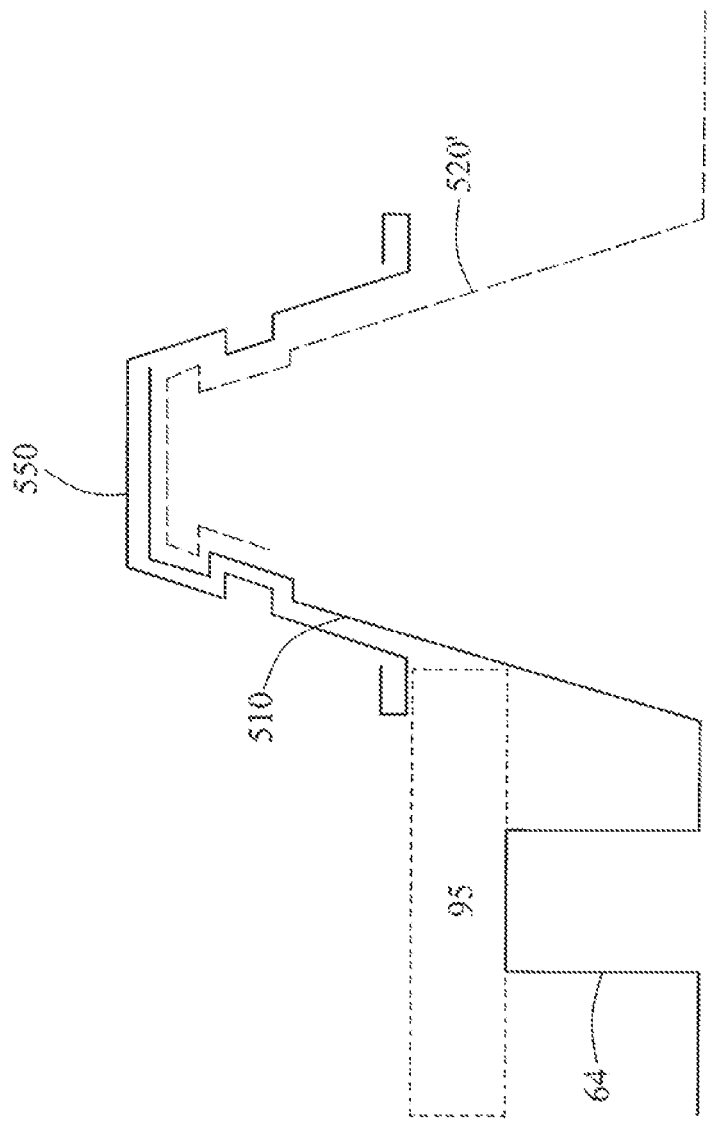

CORRUGATED ROOF SHEET AND PHOTOVOLTAIC ASSEMBLY COMPRISING THE SAME

FIELD OF THE DISCLOSURE

The present invention relates to a corrugated roof sheet and a photovoltaic assembly comprising the same, particularly to a corrugated roof sheet with multiple heights and a photovoltaic assembly comprising the same.

BACKGROUND OF THE INVENTION

With continuous depletion of fossil energy and growth of environmental concerns, many people install photovoltaic modules on their roofs to collect photovoltaic energy and convert it into electrical energy for storage.

Generally, a mounting system for supporting and/or securing photovoltaic modules needs to be installed on the roofs before installing photovoltaic modules. Such design requires extra cost for the mounting system, so on one hand it is more expensive and on the other hand it is more complicated and difficult to maintain.

SUMMARY OF THE INVENTION

The object of this invention is to provide a cheap photovoltaic assembly which is easy-to-stall and waterproof. This cheap photovoltaic assembly has photovoltaic modules installed in corrugated roof sheets without an extra mounting system. According to the present invention, this cheap photovoltaic assembly comprising corrugated roof sheets can be not only used on roofs of residential houses or farmhouses but also used on roofs of factories or office buildings.

This invention provides a corrugated roof sheet. It comprises a bottom, a first-side roof sheet edge portion, a second-side roof sheet edge portion, a first-side filling portion and second-side filling portion and a protruding portion. The first-side roof sheet edge portion has a height H1 from the bottom. The first-side fitting portion and the second-side fitting portion both are between the first-side roof sheet edge portion and the second-side roof sheet edge portion. Each of the first-side fitting portion and the second side fitting portion has a standing portion and a lateral engaging portion extending from the standing portion. The lateral engaging portion has a height h2 from the bottom. The protruding portion is between the first-side fitting portion and the second-side fitting portion and has a height h3 from the bottom. The height h2 is greater than the height h3.

This invention also provides a photovoltaic assembly comprising the foregoing corrugated roof sheet and a photovoltaic module. The photovoltaic module comprises at least one photovoltaic panel disposed in a fitting space between the lateral engaging portion and the protruding portion or a fitting space between the lower fringe and the protruding portion.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 shows the top view of the photovoltaic assembly according to the first embodiment of the present invention.

FIG. 4A shows the top view of a photovoltaic assembly according to the second embodiment of the present invention.

FIG. 6A shows the top view of a photovoltaic assembly according to the fifth embodiment of the present invention.

FIGS. 6C and 6D show examples of roof sheet edge portions and a retaining cap thereon.

DESCRIPTION OF EMBODIMENTS

The following embodiments describe structures of the corrugated roof sheets and the photovoltaic modules according to the present invention and how they are installed. It will be apparent that these embodiments may be practiced without some or all of these specific details. In other instances, well known devices or elements have not been described in detail in order not to unnecessarily obscure the present invention.

The following descriptions illustrate preferred embodiments of the present invention in detail. All the components, sub-portions, structures, materials and arrangements therein can be arbitrarily combined in any sequence despite their belonging to different embodiments and having different sequence originally. All these combinations are falling into the scope of the present invention. A person of ordinary skills in the art, upon reading the present invention, can change and modify these components, sub-portions, structures, materials and arrangements therein without departing from the spirits and scope of the present invention. These changes and modifications should fall in the scope of the present invention defined by the appended claims.

There are a lot of embodiments and figures within this application. To avoid confusions, similar components are designated by the same or similar numbers. To simplify figures, repetitive components are only marked once. The purpose of figures is to convey concepts and spirits of the present invention, so all the distances, sizes, scales, shapes and connections are explanatory and exemplary but not realistic. Other distances, sizes, scales, shapes and connections that can achieve the same functions or results in the same way can be adopted as equivalents.

Figure 1A:
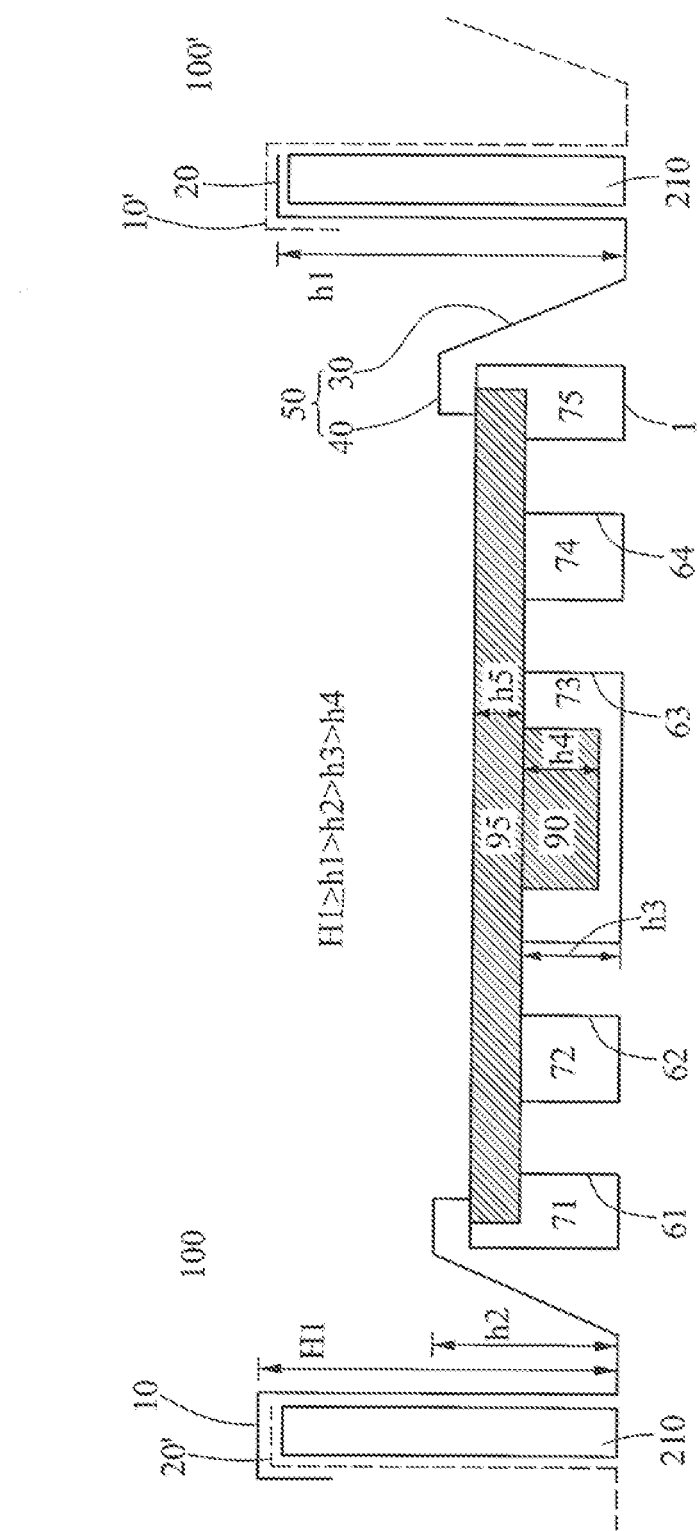
FIG. 1A shows the cross-sectional view of a photovoltaic assembly taken along the line A-A' of FIG. 3 according to the first embodiment of the present invention.
Figure 1B:
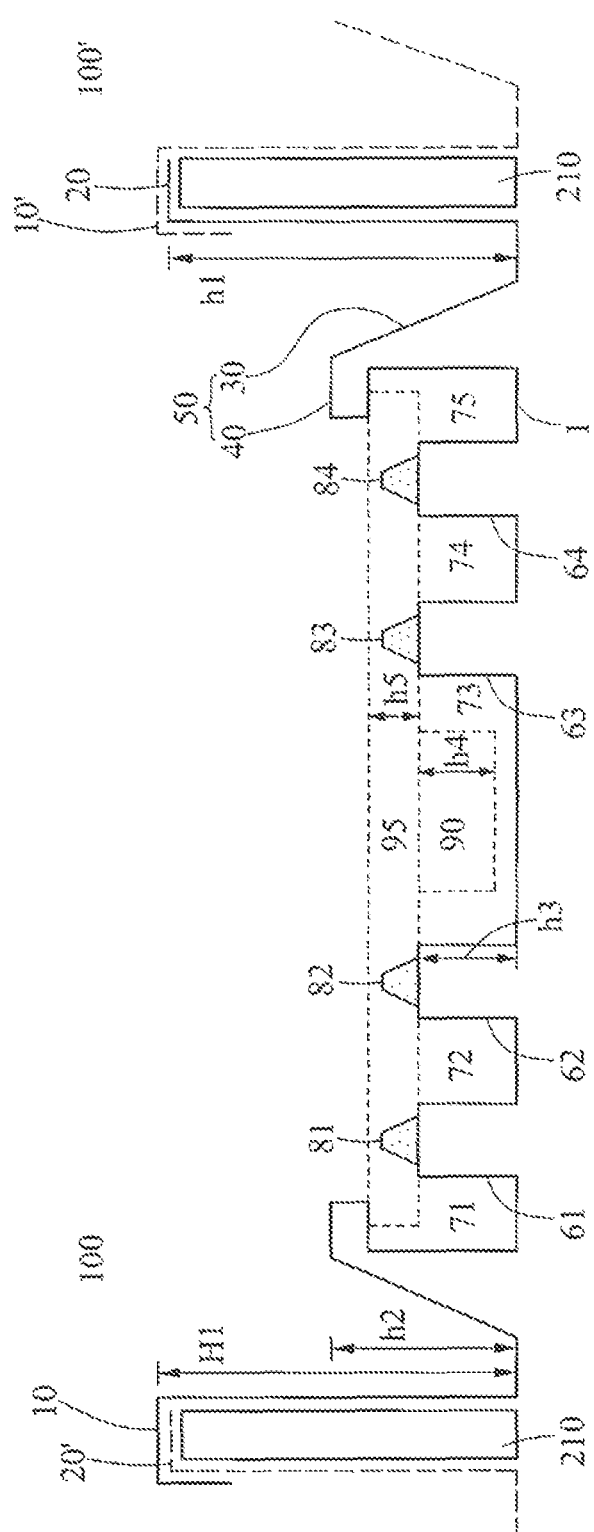
FIG. 1B shows the cross-sectional view of the photovoltaic assembly taken along the line B-B' of FIG. 3 according to the first embodiment of the present invention.
Figure 2:
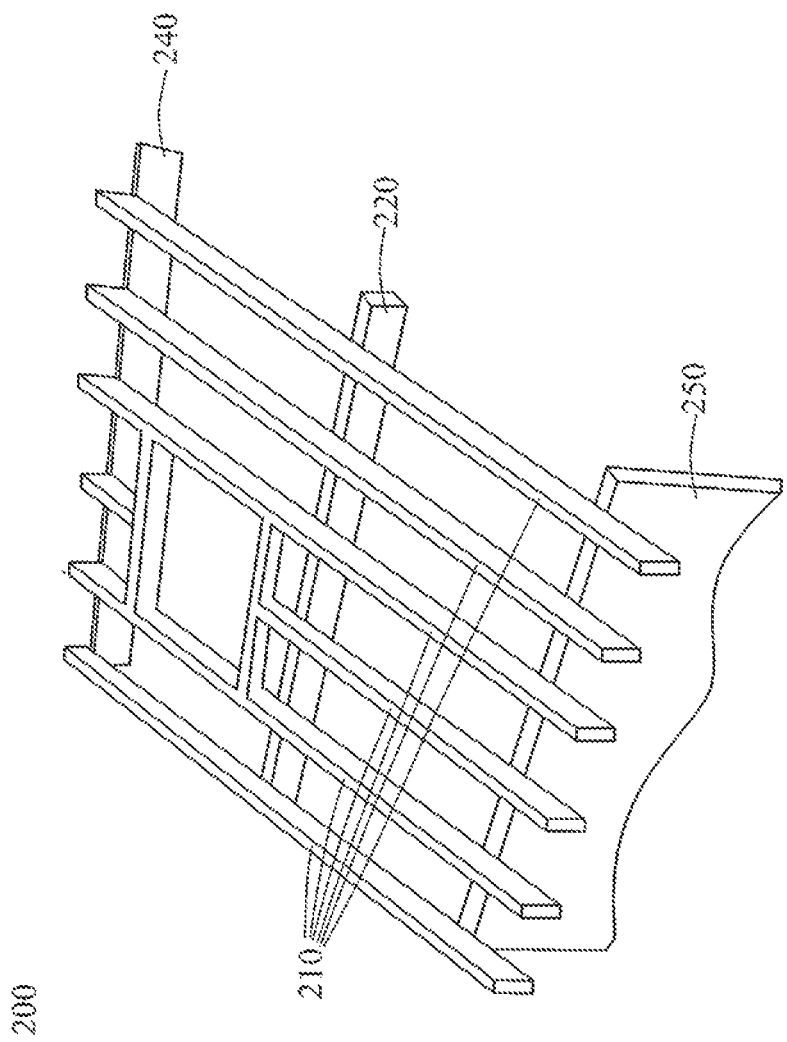
FIG. 2 shows the three-dimensional view of an exemplary roof frames the photovoltaic assembly according to the present invention is installed on the roof frame.

Please refer to FIGS. 1A, 1B, 2 and 3. FIGS. 1A and 1B show cross-sectional views of a photovoltaic assembly installed on a drafter 210 according to the first embodiment of the present invention. FIG. 2 shows an exemplary roof frame 200 and the photovoltaic assembly according to the present invention is installed on the roof frame 200. The roof frame 200 mainly comprises a ridge beam 240, a plurality of drafters 210 extending slantly from the ridge beam 240 toward a wall 250 and a purlin 220 spanning a plurality of drafters 210 to support the plurality of drafters 210. FIG. 3 shows a corrugated roof sheet 100 and its adjacent corrugated roof sheet 100' which can be coupled to the drafter 210 by screws, bolts, etc.

Please refer to FIGS. 1A, 1B and 3. FIG. 1A shows the cross-sectional view of a photovoltaic assembly taken along the line A-A' of FIG. 3. The corrugated roof sheet 100 has a bottom 1 and all the "heights" in this application are measured from the bottom 1 to a highest point of an element or to a specific point. The corrugated roof sheet 100 comprises a first-side roof sheet edge portion 10 and a second-side roof sheet edge portion 20 extending upwards from the bottom, wherein the first-side roof sheet edge portion 10 is configured to engage an adjacent corrugated roof sheet. The first-side roof sheet edge portion 10 engages with a second-side roof sheet edge portion 20' of the adjacent corrugated roof sheet closely and the second-side roof sheet edge portion 20' is partially covered by the first-side roof sheet edge portion 10, so the height H1 of the first-side roof sheet edge portion 10 (and 10') would be greater than the height h1 of the second-side roof sheet edge portion 20 (and 20') and a cross-sectional view of the first-side roof sheet edge portion 10 (and 10') takes a shape of hook in order to tightly engage the adjacent corrugated roof sheet. Such tight engagement of adjacent corrugated roof sheets can prevent rainwater from getting through the corrugated roof sheets and this makes the corrugated roof sheets according to the present invention waterproof corrugated roof sheets. Upon engagement of the adjacent corrugated roof sheets, an empty space beneath the second-side roof sheet edge portion 20 (and 20') is formed to accommodate the drafter 210 of FIG. 2, thereby coupling the corrugated roof sheets and the drafter 210 together. To strengthen the tight engagement, a cross-sectional view of the second-side roof sheet edge portion 20 (and 20') can take a shape of hook (not shown).

Now refer to FIGS. 1A and 1B. The corrugated roof sheet 100 further comprises, between the first-side roof sheet edge portion 10 and the second-side roof sheet edge portion 20, two fitting portions 50 (one is the first-side fitting portion 50 close to the first-side roof sheet edge portion 10 and the other is the second-side fitting portion 50 close to the second-side roof sheet edge portion 20) extending from the bottom 1, a plurality of protruding portions 61-64 protruding from the bottom 1 and optional auxiliary stoppers 81-84 disposed on the protruding portions 61-64. Each of the fitting portions 50 comprises a standing portion 30 and a lateral engaging portion 40 extending from the standing portion 30 toward the other side. Since a fitting space is formed between the lateral engaging portions 40 of the fitting portions 50 and a plurality of protruding portions 61-64 for accommodating a photovoltaic module, the height h2 of the lateral engaging portion 40 is grater than the height h3 of the protruding portions 61-64. In the present invention, the photovoltaic module is mainly formed of a photovoltaic panel 95 and an electronic box 90, wherein the electronic box 90 may comprise input/output circuitry, control chip or other chips, transmission lines for the photovoltaic module and any other circuitries necessary for operations and functions of the photovoltaic module. When the photovoltaic module is installed within the corrugated roof sheet 100, the photovoltaic panel 95 would be kept in position in the thickness direction due to laying against the protruding portions 61-64 (see FIG. 1A) and the electronic box 90 extends from the photovoltaic panel 95 (which is against the top surface of the protruding portions 61-64) toward the bottom 1 of the corrugated roof sheet 100. Therefore, the height h3 of the plurality of protruding portions 61-64 is greater than the thickness h4 of the electronic box 90. Moreover, gaps 71-75 between the plurality of protruding portions 61-64 and the standing portions 30 of two fitting portions 50 can he used as channels for draining and/or collecting rainwater to prevent rainwater from accumulating on the corrugated roof sheet 100. Although in the figures the sidewalls of the protruding portions 61-64 are perpendicular to the bottom 1, these side wails may form any angles with respect to the bottom 1 and the protruding portions 61-64 may take other shapes and/or rounded corners.

Now refer to FIGS. 1A, 1B and 3. In the process of installing the photo voltaic module into the corrugated roof sheet 100, first a set of auxiliary stoppers 81-84 are installed or disposed on the protruding portions 61-64 at predetermined locations of the corrugated roof sheet 100 (for example, by the lower edge of the photovoltaic module), then a photovoltaic module slides into a fitting space between the two fitting portions and the plurality of protruding portions 61-64 (see FIG. 1A) from the top of the corrugated roof sheet 100 (when the corrugated roof sheet 100 is viewed in a top view like FIG. 3). Due to the set of auxiliary stoppers 81-84, the photovoltaic module sliding into the fitting space would stop slide down and he kept in position upon touching the set of auxiliary stoppers 81-84 (see FIG. 1B, the photovoltaic module is shown in phantom line because it is behind the set of auxiliary stoppers 81-84). Next, repeat the same steps described until there is not enough room within the corrugated roof sheet 100 for one more photovoltaic module. That is, first another set of auxiliary stoppers 81-84 are installed or disposed on the protruding portions 61-64 at another predetermined locations of the corrugated roof sheet 100, then another photovoltaic module slides into the corrugated roof sheet 100 and be kept in position by the another set of auxiliary stoppers 81-84. Although FIG. 3 only shows two photovoltaic modules, each corrugated roof sheet 100 may hold multiple photovoltaic modules such as 10 or more photovoltaic modules depending on the lengths of the corrugated roof sheet 100 and the photovoltaic module. Although in this embodiment four rectangular protruding portions 61-64 and four trapezoid auxiliary stoppers 81-84 (see FIG. 1B) are used, the numbers and shapes of the protruding portions and auxiliary stoppers may be modified. For example, when the width of the corrugated roof sheet 100 is decreased (or increased), less (or more) protruding portions and less (or more) auxiliary stoppers can be used. For example, one may use trapezoid protruding portions and rectangular auxiliary stoppers. For example, one may use oval auxiliary stoppers instead of circular auxiliary stoppers (see top view of FIG. 3). For example, when viewed in top view, the protruding portions 61-64 may have a plurality of sub-portions arranged periodically along the length direction of the corrugated roof sheet 100 instead of extending along the length direction of the corrugated roof sheet 100 with fixed width. For example, the auxiliary stoppers 81-84 may be merged into a long strip spanning a plurality of protruding portions 61-64. For example, the auxiliary stopper may have a lateral engaging portion to look like a hook. In this case, the hook of the fitting portion 50 is oriented along the width direction of the corrugated roof sheet 100 while the hook of the auxiliary stopper is oriented along the length direction of the corrugated roof sheet 100. In this case, because the corrugated roof sheet 100 is flexible, each photovoltaic module does not have to slide clown from the top of the corrugated roof sheet 100. The photovoltaic module can slide into the corrugated roof sheet 100 from the upper edge of its predetermined settling area and stop sliding down upon touching the hooks of the auxiliary stoppers disposed at the lower edge of the predetermined settling area, it is noted that the auxiliary stoppers 81-84 may be added to the corrugated roof sheet 100 via screws, bolts or glue or may be formed together with corrugated roof sheet 100 in one structure. Preferably, the auxiliary stoppers 81-84 and the corrugated roof sheet 100 are formed in one structure.

In this embodiment, the first-side roof sheet edge 10, the first fitting portion 50, a plurality of protruding portions 61-64, the second filling portion 50 and the second-side roof sheet edge 20 of the corrugated roof sheet 100 are all connected to the bottom 1 and all formed with the bottom 1 in one structure. When a metallic material and/or alloy are used to form the corrugated roof sheet 100, the corrugated roof sheet 100 can he formed by compression. When a composite -material and/or polymer is used to form the corrugated roof sheet 100, the corrugated roof sheet 100 can be formed by extrusion. However, the corrugated roof sheet 100 of the present invention is not limited to the materials and methods mentioned above. Furthermore, according to previous paragraphs, the height H1 of the first-side roof sheet edge portion 10, the height h1 of the second-side roof sheet edge portion 20, the height h2 of the lateral engaging portion 40 of the fitting portion 50. the height h3 of the plurality of protruding portions 61-64 and the thickness h4 of the electronic box 90 would comply the following relation: H1≥h1; h2>h3>h4. The heights H1 and h1 could be greater than h2 (as shown in figures), but they may be less than h2 depending on the thickness of the drafter 210. Generally, the height H1 is a little bit greater than the height h1 or substantially equivalent to the height h1, so the first-side roof sheet edge portion 10 can be easily engaged with the second-side roof sheet edge portion 20' by slight distortion.

Figure 4B:
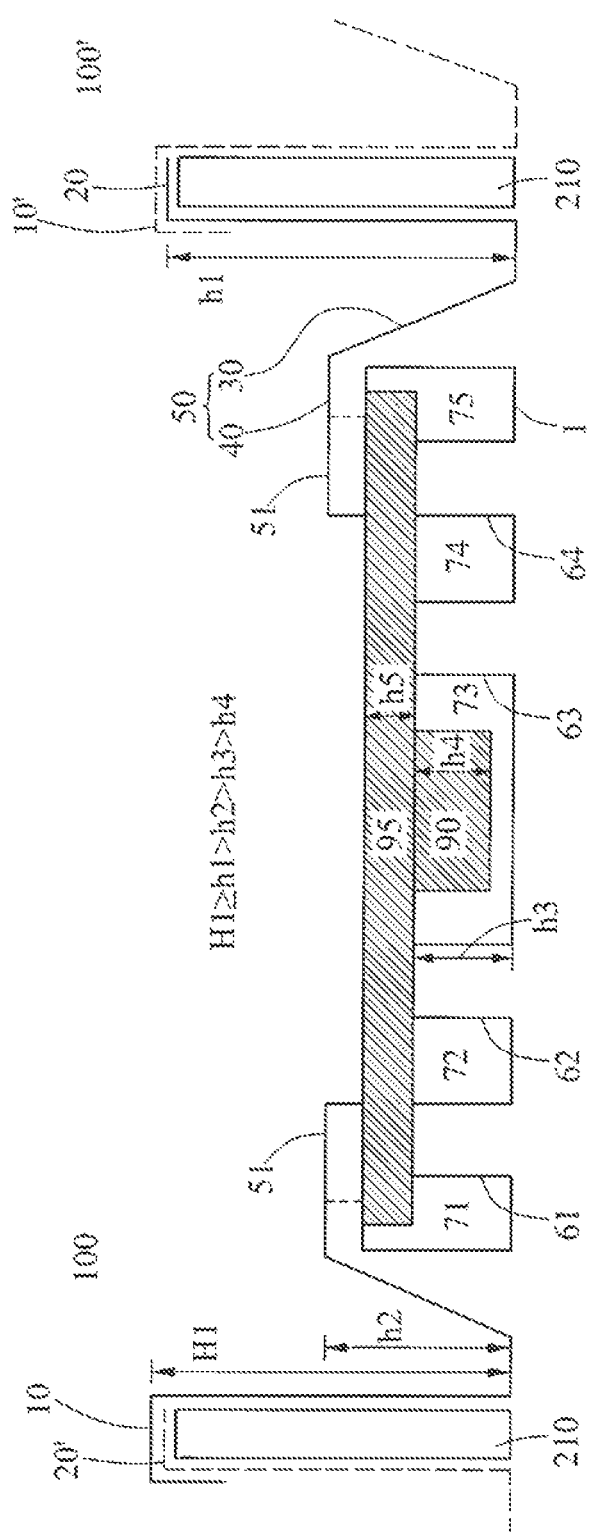
FIG. 4B shows the cross-sectional view of the photovoltaic assembly taken along the line C-C' of FIG. 4A according to the second embodiment of the present invention.
Figure 4C:
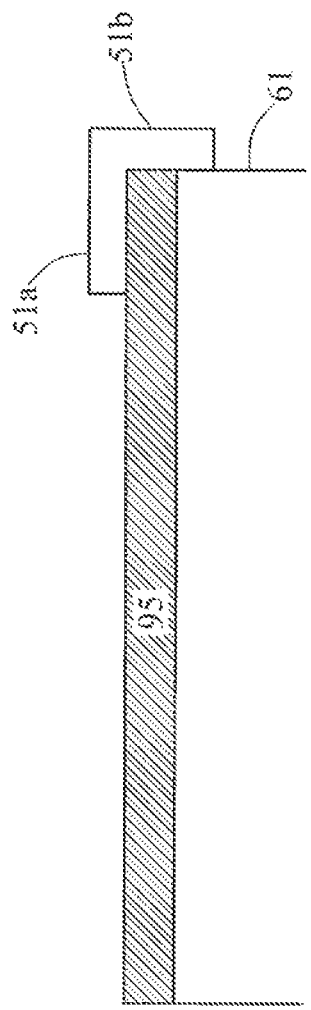
FIG. 4C shows the cross-sectional view of the photovoltaic assembly taken along the line D-D' of FIG. 4A according to the second embodiment of the present invention.

Now please refer to FIGS. 4A, 4B and 4C. FIG. 4A shows the top view of a photovoltaic assembly according to the second embodiment of the present invention. FIG. 4B shows the cross-sectional view of the photovoltaic assembly taken along the line C-C' of FIG. 4A. The second embodiment shown in FIG. 4A is a variation of the first embodiment shown in FIG. 3. The difference between the first embodiment and the second embodiment lies in the fitting portions. In FIG. 4A, the fitting portions (50+51) do not have fixed widths along the length direction of the corrugated roof sheet. The fitting portions (50+51) of FIG. 4A have extra width 51 by the lower edge of the photovoltaic panel to help clamp the photovoltaic panel. FIG. 4B shows the extra width 51 is long enough to go over at least one protruding portion (61 or 64), but the extra width may be longer than shorter. FIG. 4C shows the cross-sectional view of the photovoltaic assembly taken along the line D-D' of FIG. 4A. FIG. 4C shows the extra width 51 can not only extend laterally but also extend downward so as to serve the function of the auxiliary stoppers and replace them. In this case, the extra width 51 has not only a lateral portion 51a and but also a downward engaging portion 51b configured to stop the photovoltaic panel from sliding.

Figure 5A:
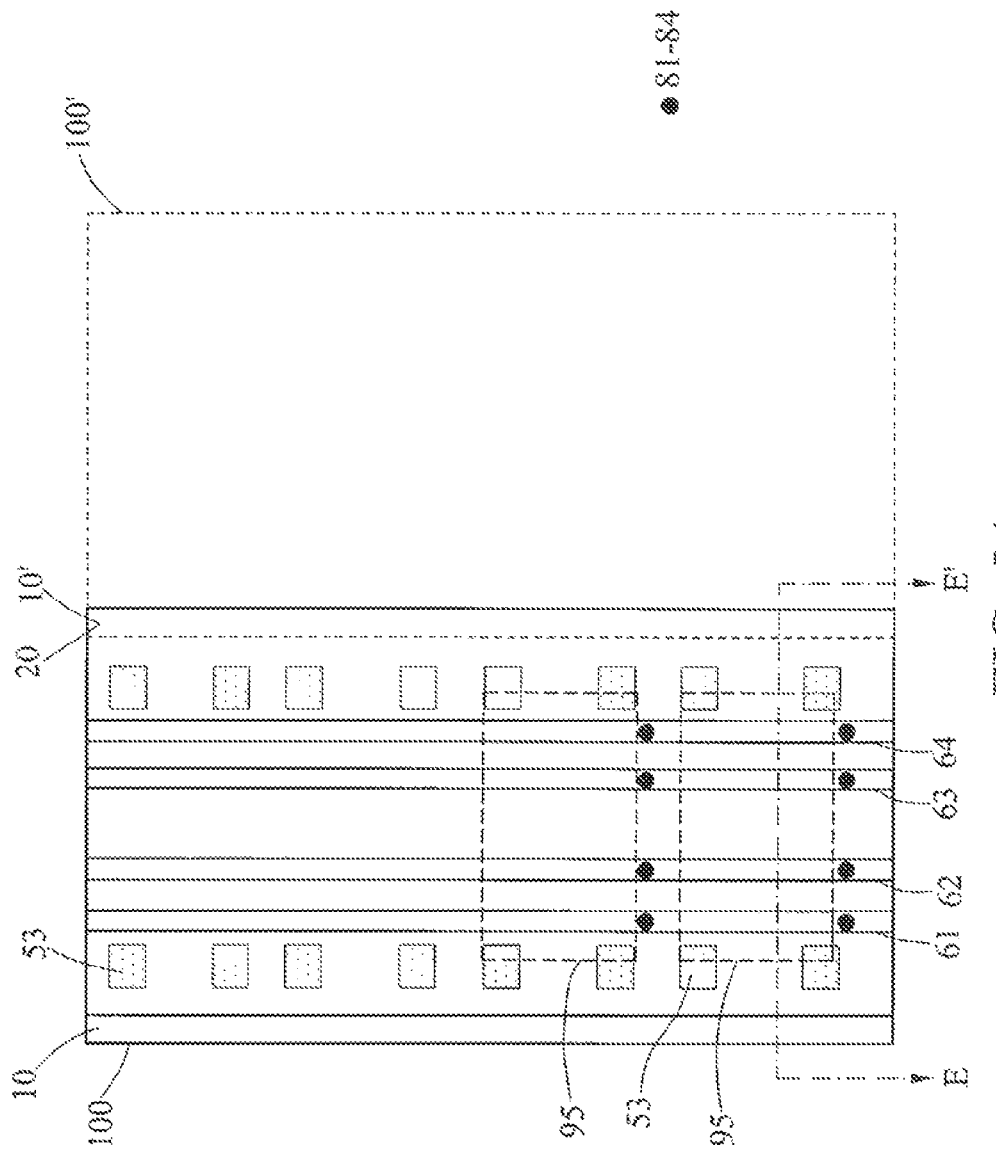
FIG. 5A shows the top view of a photovoltaic assembly according to the third embodiment of the present invention.
Figure 5B:
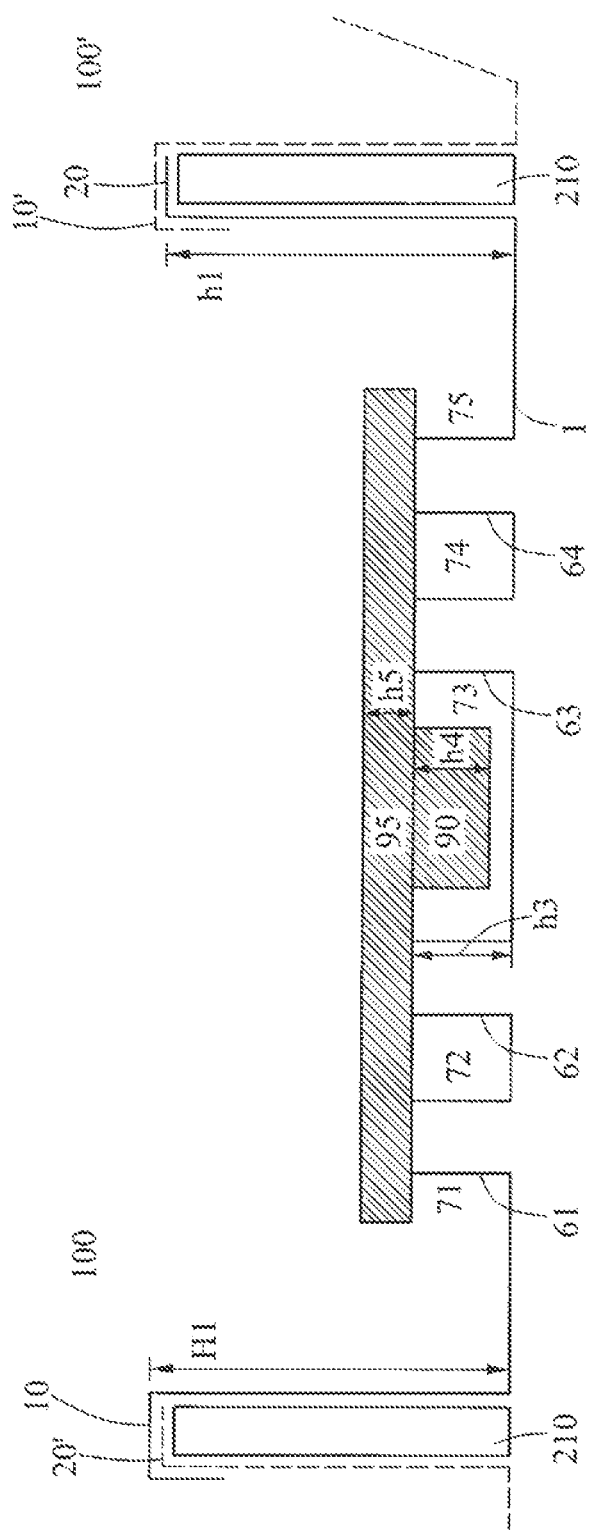
FIG. 5B shows the cross-sectional view of the photovoltaic assembly taken along the line E-E' of FIG. 5A according to the third embodiment of the present invention.

Now please refer to FIGS. 5A and 5B. FIG. 5A shows the top view of a photovoltaic assembly according to the third embodiment of the present invention. FIG. 5B shows the cross-sectional view of the photovoltaic assembly taken along the line E-E' of FIG. 5A. The third embodiment shown in FIG. 5A is a variation of the first embodiment shown in FIG. 3. The difference between the first embodiment and the third embodiment lies in the fitting portions. In FIG. 5A, each of the first-side fitting portion and the second-side fitting portion has multiple sub-portions 53 disposed periodically along the length direction of the corrugated roof sheet. That is, the first-side fitting portion and the second-side fitting portion do not have fixed widths along the length direction of the corrugated roof sheet and the multiple sub-portions thereof are disposed by four corners of the photovoltaic panel 95. Since the cross-sectional view of the fitting portions is the same as the one shown in FIG. 1A, FIG. 5B shows a cross-sectional view where no fitting portions present.

Figure 5C:
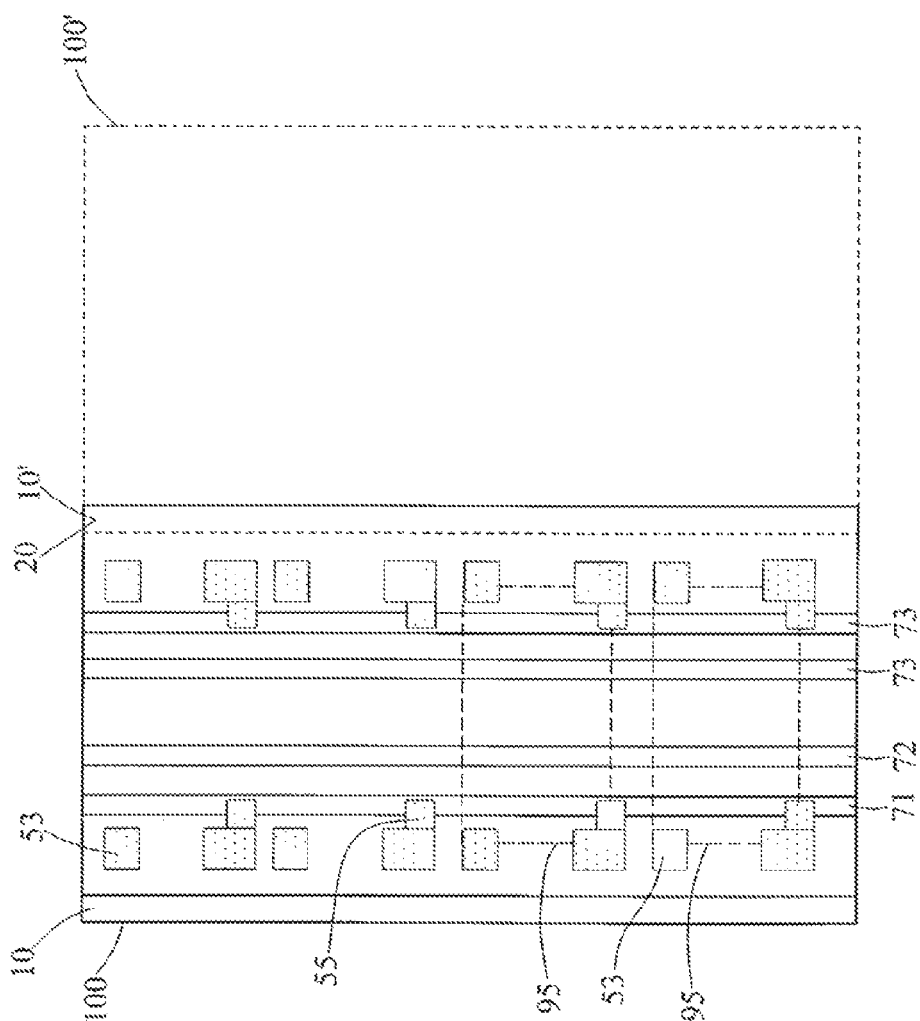
FIG. 5C shows the top view of a photovoltaic assembly according to the fourth embodiment of the present invention.

Now please refer to FIG. 5C. FIG. 5C shows the top view of a photovoltaic assembly according to the fourth embodiment of the present invention. The fourth embodiment shown in FIG. 5C is a variation of the third embodiment shown in FIG. 5A. The difference between the third embodiment and the fourth embodiment lies in the fitting portions. In FIG. 5C, the two sub-portions by the lower edge of the photovoltaic panel 95 have extra widths 55, so the four sub-portions at the four corners of the photovoltaic panel are not the same in size. The extra width 55 are similar to the extra width 51 of FIG. 4A in terms of it function and structure. The extra width 55 may have not only a lateral portion but also a downward engaging portion to stop the photovoltaic panel 95 from sliding. Since a cross-sectional view of the extra width is similar to the one of the extra width 51 (FIG. 4B or FIG. 4C), it is not repeated.

Figure 6B:
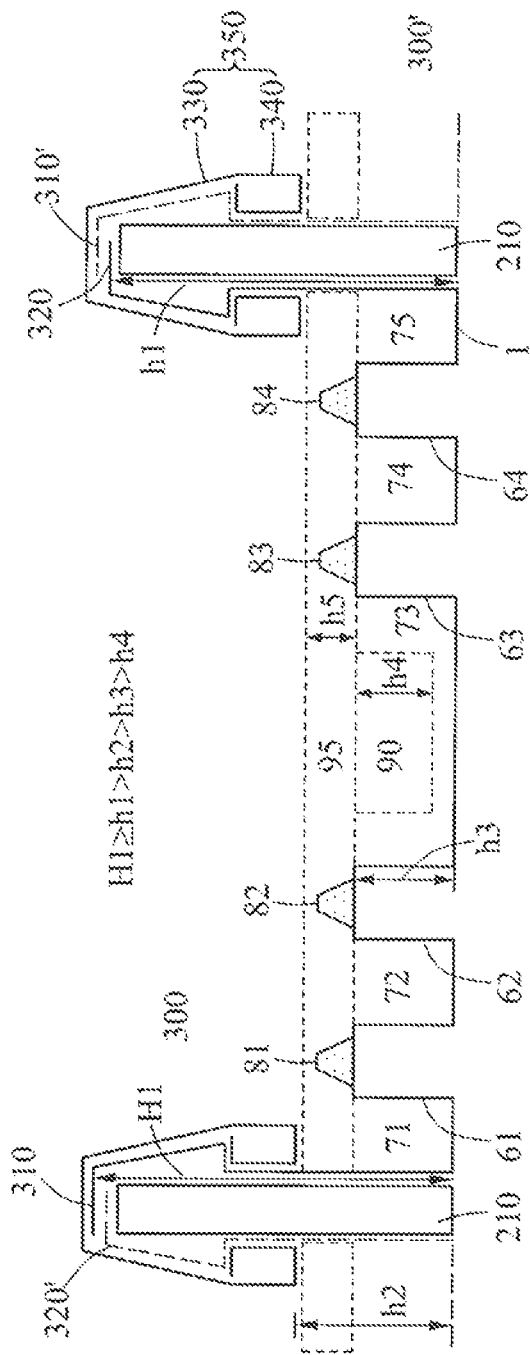
FIG. 6B shows the cross-sectional view of the photovoltaic assembly taken along the line F-F' of FIG. 6A according to the fifth embodiment of the present invention.

Please refer to FIGS. 6A and 6B. FIG. 6A shows the top view of a photovoltaic assembly according to the fifth embodiment of the present invention. FIG. 6B shows the cross-sectional view taken along line F-F' of FIG. 6A. The fifth embodiment shown in FIG. 6A is a variation of the first embodiment shown in FIG. 3. The difference between the fifth embodiment and the first embodiment lies in the following points: 1. there are no fitting portions 50 in FIG, 6A; 2, the shapes of the first-side roof sheet edge portion 310 (and the first-side roof sheet edge portion 310' of the adjacent corrugated roof sheet) and the second-side roof sheet edge portion 320 (and the second-side roof sheet edge portion 320' of an adjacent corrugated roof sheet) are different from the shapes of the first-side roof sheet edge portion 10 and the second-side roof sheet edge portion 20 of FIG. 3; 3. there is an additional retaining cap 350 covering the first-side roof sheet edge portion 310 (and the first-side roof sheet edge portion 310' of the adjacent corrugated roof sheet) in FIG. 6A. The rest of components of this embodiment are the same as the ones of the first embodiment of FIG. 3.

In the fifth embodiment shown in FIGS. 6A and 6B, the first-side roof sheet edge portion 310 and the second-side roof sheet edge portion 320 jointly form a mushroom shape (the larger upper part is a trapezoid-shaped cap and the smaller lower part is a stem). The first-side roof sheet edge portion 310 engages with the second-side roof sheet; edge portion 320' of an adjacent corrugated roof sheet closely and the second-side roof sheet edge portion 320 is partially covered by the first-side roof sheet edge portion 310' of another adjacent corrugated roof sheet closely. Therefore, the height H1 of the first-side roof sheet edge portion 310 (and 310') would be grater than or substantially equivalent to the height h1 of the second-side roof sheet edge portion 320 (320') and each of the first-side roof sheet edge portion 310 (320') and the second-side roof sheet edge portion 320 takes a half of the mushroom shape in cross-sectional view. In this embodiment, the retaining cap 350 comprises an upper capping portion 330 and two lower engaging portions 340 extending from the upper capping portion 330. The upper capping portion 330 covers the first-side roof sheet edge portion 310 (and 310') and the second-side roof sheet edge portion 320 (and 320') closely in order to couple the first-side roof sheet edge portion 310 (and 310') and the second-side roof sheet edge portion 320 (and 320') tightly. There is a fitting space formed between a lower fringe of the lower engaging portion 340 and the plurality of protruding portions 61-64 to accommodate a photovoltaic module. Therefore, the height h2 of the lower fringe of the lower engaging portion 340 is greater than the height h3 of the protruding portions 61-64. Similarly, upon engagement of the adjacent corrugated roof sheets, an empty space beneath the second-side roof sheet edge portion 320 (and 320') is formed to accommodate the drafter 210 of FIG. 2, thereby coupling the corrugated roof sheets and the drafter 210 together.

In the fifth embodiment shown in FIGS. 6A and 6B, the retaining cap 350 has not only the function of the fitting portions 50 of the first embodiment to keep a photovoltaic module in position but also the function to couple adjacent corrugated roof sheets. Therefore, in a top view, the retaining cap may have a fixed width and extend along the length direction of the corrugated roof sheet as shown in FIG. 6A, or it may comprise multiple sub-portions like the sub-portions 53 disposed by four corners of the photo voltaic panel 95. Or, the retaining cap, either having fixed width or comprising multiple sub-portions, may be additionally added to the first-side roof sheet edge portion 10 (and 10') and the second-side roof sheet edge portion 20 (and 20') of FIG. 3, FIG. 4A and FIG. 5A. Furthermore, the first-side roof sheet edge portion 310 and the second-side roof sheet, edge portion 320 may take other forms/shapes such as wavy shape and the retaining cap would change its shape accordingly to match the edge portions 310 and 320. Moreover, in a case where the retaining cap 350 is tightly against the photo voltaic panel 95 that the photovoltaic panel 95 can he kept well in position or in a case where the retaining cap 350 is additional, added to anyone of the embodiments described previously that the photovoltaic panel 95 can be kept well in position, the auxiliary stoppers 81-84 can be omitted. FIGS. 6C and 6D show other feasible variations of the retaining cap (450 and 550) and the roof sheet edge portions (410, 420', 510 and 510'), The embodiments of FIGS. 6A-6C can all couple the corrugated roof sheets and the photovoltaic panels tightly together without using any rivets or screws.

Similarly, the first-side roof sheet edge 310, a plurality of protruding portions 61-64 and the second-side roof sheet edge 320 of the corrugated roof sheet 300 are all connected to the bottom 1 and ail formed with the bottom 1 in one structure. When a metallic material and/or alloy are used to form the corrugated roof sheet 300, the corrugated roof sheet 300 can be formed by compression. When a composite material and/or polymer is used to form the corrugated roof sheet 300, the corrugated roof sheet 300 can be formed by extrusion. However, the corrugated roof sheet 300 of the present invention is not limited to the materials and methods mentioned above. Furthermore, according to previous paragraphs, the height H1 of the first-side roof sheet edge portion 310, the height h1 of the second-side roof sheet edge portion 320, the height h2 of the lower fringe of the lower engaging portion 340, the height h3 of the plurality of protruding portions 61-64 and the thickness h4 of the electronic box 90 would comply the following relation: $H1 \geq h1$; $h2 > h3 > h4$. Generally, the height H1 is a little bit greater than the height h1 or substantially equivalent to the height h1, so the first-side roof sheet edge portion 310 can be easily engaged with the second-side roof sheet edge portion 320' by slight distortion. Moreover, the heights H1 and h1 may he grater than the height h2 as shown in FIG. 6B, but they may be equivalent to or smaller than the height h2.

Figure 6E:
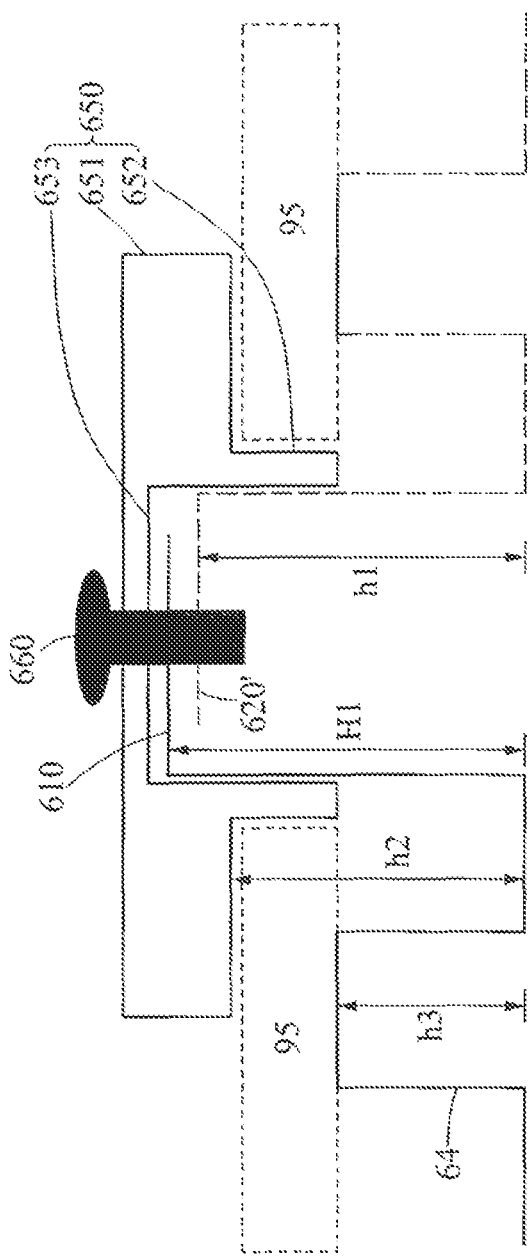
FIG. 6E shows the cross-sectional view of the photovoltaic assembly according to the sixth embodiment of the present invention, illustrating schematically roof sheet edge portions and a retaining cap thereon.

Now please refer to FIG. 6E. FIG. 6E shows the cross-sectional view of the photovoltaic assembly according to the sixth embodiment of the present invention. In order to clearly illustrate the spatial relation of roof sheet edge portions and the retaining cap thereon, FIG. 6E omits the components similar to the components shown in the fifth embodiment such as the protruding portions 61-64, the electronic box 90 and the auxiliary stoppers 81-84. For the details of these omitted components, please refer to the fifth embodiment. The main difference between the sixth embodiment shown in FIG. 6E and the fifth embodiment lies in the additional fastener 660 configured to couple the retaining cap and the roof sheet edge portions. In FIG. 6E. the first-side roof sheet edge portion 610 has a height H1 from the bottom and the sec end-side roof sheet edge portion 620' has a height h1 from the bottom. The retaining cap 650 covers the first-side roof sheet edge portion 610 and has a lateral portion 651, two vertical portions and a recess 653. The lower fringe of the lateral portion 651 has a height from the bottom and is configured to keep the photovoltaic panel 95 in position In the vertical direction. The two vertical portions 652 are extended from the lateral portion 651 to a gap between the roof sheet edge portions 610/620' and the photovoltaic panel 95 in order to keep the photovoltaic panel 95 in position In the lateral direction. The recess 653 is configured to engage with the roof-sheet edge portions 610/620', thereby coupling adjacent corrugated roof sheets together tightly. Therefore, the width of the recess 653 depends on the size of the roof sheet edge portions and the depth of the recess 653 should be great enough to ensure safe engagement. In a preferred embodiment, the lateral portion 651, the two vertical portions 652 are formed of the same material such as a metal sheet or a plastic sheet in one structure. In order to strengthen the tight engagement, one or more additional fasteners 660 so eh as screws and rivets may be used to penetrate the lateral portion 651 (where the recess 653 is) and the roof sheet edge portions 610/620' from top to bottom as shown in FIG. 6E. However, the present invention is not limited thereto. The fastener 660 may also penetrate the roof sheet edge portions 610/620' from bottom to top, then the retaining cap 650 covers the fastener 660 and the roof sheet edge portions 610/620'. Or, the fastener 660 may penetrate not only the roof sheet edge portions 610/620' and the retaining cap 650 from top to bottom hut also extend into a portion of the roof frame such as the drafter or the purlin. Furthermore, according to previous paragraphs, the height H1 of the first-side roof sheet edge portion 610, the height h1 of the second-side roof sheet edge portion 620, the height h2 of the lower fringe of the lateral portion 651, the height h3 of the plurality of protruding portions 61-64 and the thickness h4 of the electronic box 90 would com ply the following relation: $H1 \geq h1$; $h2 > h3 > h4$.

In the sixth embodiment, the corrugated roof sheets and the retaining cap 650 are all made in one structure respectively either by compression or by extrusion and are coupled tightly together through engagement and fastener 660. The features of this embodiment can be combined with features of other embodiments or details from other embodiments can he added into this embodiment. For example, the auxiliary stoppers 81-84 may be omitted. For example, the protruding portions 61-64 may have hooks by the lower edge of the photovoltaic panel. For example, the protruding portions 61-64 may have corner-rounded shape or other shapes. For example, the retaining cap of this embodiment may extend along the length direction of the corrugated roof sheet with a fixed width as shown in FIG. 6B. Or, the retaining cap of this embodiment may have multiple sub-portions disposed by four corners of the photovoltaic panel 95 as the sub-portions 53 shown in FIG. 5A. Or, combining FIGS. 6D and 6E, the vertical portions of the retaining cap 650 and the vertical portions of the roof sheet edge portions may have wavy shapes to engage with each other better; the fastener 660 penetrates two adjacent roof sheets, then the retaining cap 650 covers the fastener 660 and the two adjacent roof sheets. In this case, the retaining cap 650 can not only keep the photovoltaic panel in position but also protect the fastener 660 from water.

The present invention provides a cheap photovoltaic assembly which is easy-to-stall and waterproof. This cheap photovoltaic assembly has photovoltaic modules installed in corrugated roof sheets for constructing buildings without an extra mounting system. The corrugated roof sheets according to the present invention are waterproof due to close engagement between adjacent corrugated roof sheets and they keep the photovoltaic assembly in position without screws or rivets, thereby becoming easy-to-stall and easy-to-maintain.

Although FIGS. show drafters or purlin and the corrugated roof sheets engaged with the drafter, the present invention is not limited thereto. The corrugated roof sheets may engage with a purlin. Or, the corrugated roof sheets may he fixed to the drafter or purlin of the roof frame by fasteners.

While the invention has been described in terms of what is presently considered to he the most practical and preferred embodiments, it is to be understood that the invention needs not be limited to the disclosed embodiment. On the contrary, it is intended to cover various modifications and similar arrangements included within the spirit and scope of the appended claims which arc to be accorded with the broadest interpretation so as to encompass all such modifications and similar structures.

The invention claimed is:

1. A corrugated roof sheet comprising:
a bottom;
a first-side roof sheet edge portion having a height H1 from the bottom;
a second-side roof sheet edge portion;
a first-side fitting portion and second-side fitting portion both disposed between the first-side roof sheet edge portion and the second-side roof sheet edge portion, the first-side fitting portion having a first standing portion extending from the bottom and a first lateral engaging portion extending from the first standing portion toward the second-side roof sheet edge portion, the first lateral engaging portion having a height h2 from the bottom; and
a protruding portion disposed between the first-side fitting portion and the second-side fitting portion and having a height h3 from the bottom,
wherein the height h2 is greater than the height h3.

2. The corrugated roof sheet according to claim 1, further comprising an adjacent corrugated roof sheet, wherein the first-side roof sheet edge portion engages with a second-side roof sheet edge portion of the adjacent corrugated roof sheet closely.

3. The corrugated roof sheet according to claim 1, wherein there is a vertical fitting space for accommodating a photovoltaic module between the first lateral engaging portion and the protruding portion.

4. The corrugated roof sheet according to claim 3, wherein the photovoltaic module comprises an electronic box having a thickness h4 and the thickness h4 is less than the height h3.

5. The corrugated roof sheet according to claim 1, further comprising a plurality of auxiliary stoppers disposed on the protruding portion at predetermined locations of the corrugated roof sheet.

6. The corrugated roof sheet according to claim 1, wherein each of the first-side fitting portion and the second-side fitting portion extends along a length direction of the corrugated roof sheet and has a fixed width.

7. The corrugated roof sheet according to claim 1, wherein each of the first-side fitting portion and the second-side fitting portion has multiple sub-portions disposed periodically along a length direction of the corrugated roof sheet.

8. The corrugated roof sheet according to claim 1, wherein corrugated roof sheet is formed in one structure.

9. A photovoltaic assembly comprising:
a corrugated roof sheet comprising:
a bottom;
a first-side roof sheet edge portion and a second-side roof sheet edge portion, the first-side roof sheet edge portion configured to engage with a second-side roof sheet edge portion of an adjacent corrugated roof sheet;
a first-side fitting portion and second-side fitting portion both disposed between the first-side roof sheet edge portion and the second-side roof sheet edge portion, each of the first-side fitting portion and the second-side fitting portion having a standing portion and a lateral engaging portion extending from the standing portion toward the other side; and
a protruding portion disposed between the first-side fitting portion and the second-side fitting portion, and
a photovoltaic module comprising at least one photovoltaic panel, the at least one photovoltaic panel is disposed in a vertical fitting space between the lateral engaging portion and the protruding portion and is in physical contact with the lateral engaging portion and the protruding portion both.

10. The photovoltaic assembly according to claim 9, further comprising a plurality of auxiliary stoppers disposed on the protruding portion at predetermined locations of the corrugated roof sheet.

11. The photovoltaic assembly according to claim 9, wherein each of the first-side fitting portion and the second-side fitting portion extends along a length direction of the corrugated roof sheet and has a fixed width.

* * * * *